United States Patent [19]
Adams

[11] Patent Number: 5,781,732
[45] Date of Patent: Jul. 14, 1998

[54] FRAMEWORK FOR CONSTRUCTING SHARED DOCUMENTS THAT CAN BE COLLABORATIVELY ACCESSED BY MULTIPLE USERS

[75] Inventor: William Adams, Oakland, Calif.

[73] Assignee: Object Technology Licensing Corp., Cupertino, Calif.

[21] Appl. No.: 667,118

[22] Filed: Jun. 20, 1996

[51] Int. Cl.[6] .................................................... G06F 19/00
[52] U.S. Cl. .................................. 395/200.35; 395/331
[58] Field of Search ................................. 395/683, 330, 395/331, 200.34, 200.35; 345/330, 331

[56] References Cited

U.S. PATENT DOCUMENTS

| | | | |
|---|---|---|---|
| 5,008,853 | 4/1991 | Bly et al. | 395/331 |
| 5,394,521 | 2/1995 | Henderson, Jr. et al. | 395/158 |
| 5,446,842 | 8/1995 | Schaeffer et al. | 395/200.35 |
| 5,537,526 | 7/1996 | Anderson et al. | 395/777 |
| 5,583,993 | 12/1996 | Foster et al. | 395/200.35 |
| 5,615,336 | 3/1997 | Robson et al. | 395/683 |
| 5,664,208 | 9/1997 | Pavley et al. | 395/777 |

FOREIGN PATENT DOCUMENTS

WO A
9419751   1/1994   WIPO.

OTHER PUBLICATIONS

Opper S., "A Groupware Toolbox" *Byte*, Dec. 1988 USA, vol. 13, No. 13, ISSN 0360-0580, pp. 275-282, XP002043747.

Chien-Hung Lin, et al., "CCDES—a Collaborative Compound Document Editing System", *Computer Communications*, Jun. 1996, Elsevier, UK, vol. 19, No. 6-7, ISSN 0140-3664.

Koch M., "Design Issues and Model for a Distributed Multi-User Editor", *Comput. Support. Coop. Work (CSCW)* (Netherlands), Computer Supported Cooperative Work (CSCW), 1995, Kluwer Academic Publishers, Netherlands, vol. 3, No. 3-4, ISSN 0925-9724, pp. 359-378, XP002043748.

Haake J. M. et al., "Supporting Collaborative Writing of Hyperdocuments in Sepia", *Sharing Perspectives*, Toronto, Oct. 31-Nov. 4, 1992, 31 Oct. 1992, Turner J; Kraut J., pp. 138-146, ZP000337575.

*Primary Examiner*—Lance Leonard Barry
*Attorney, Agent, or Firm*—Kudirka & Jobse

[57] ABSTRACT

A Shared Document Framework for use by an application program provides collaborative access to a shared document by means of a caucus service associated with the shared document. The caucus service receives messages from caucus members and broadcast transmits them to all caucus members in global order. The Framework includes shared document class information, from which a shared document instance may be created. The shared document class information includes program code logic for creating a local copy of the document being shared; program code logic for causing the application program to join the caucus service as a member; program code logic for receiving a command binding from the application program and sending it to the caucus service as a message; and program code logic, responsive to a command binding broadcast by the caucus, for applying the received command binding to the document when the application program did not send the command binding and for applying the original command binding when the application program did send the command binding.

25 Claims, 10 Drawing Sheets

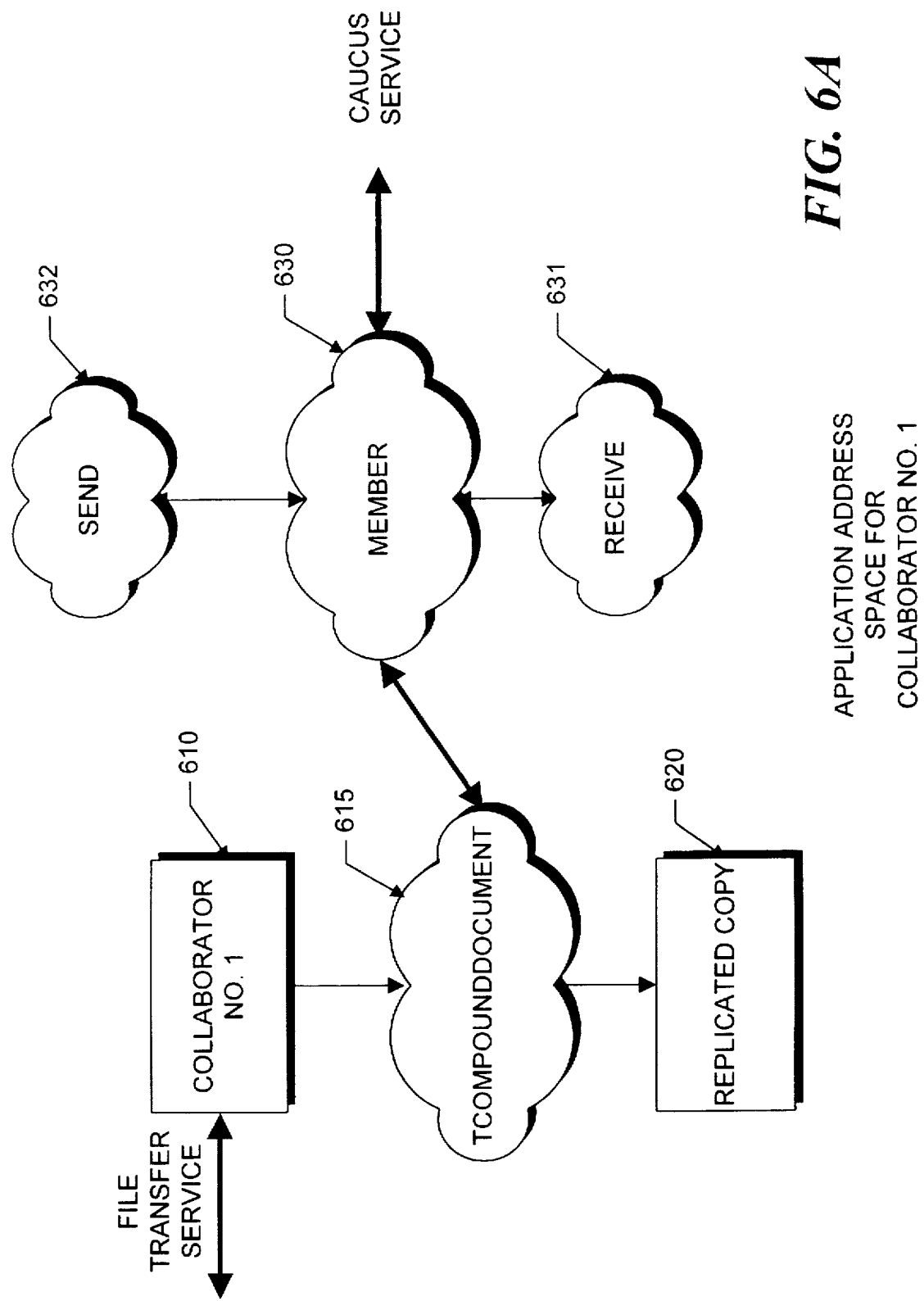

FRAMEWORK FOR CONSTRUCTING SHARED DOCUMENTS THAT CAN BE COLLABORATIVELY ACCESSED BY MULTIPLE USERS

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office. All other rights are expressly reserved.

FIELD OF THE INVENTION

This invention generally relates to improvements in computer systems and, more particularly, to frameworks that allow application developers to construct applications that allow collaborative access to a document by multiple users.

BACKGROUND OF THE INVENTION

Current computing applications are largely single user systems. For example, conventional editing applications allow a single user to open a file and make modifications to the content. If while the file is open by a first user, a second user attempts to open the file, the second user will be prevented from opening or modifying the file. The second user is sometimes permitted to obtain a snapshot copy of the file. The snapshot copy, however, is not updated with any of the subsequent modifications made to the original copy made by the first user. Thus, the second user is unable to share in the first user's ideas manifested as file modifications. Moreover, the second user is prevented from modifying the content of the original file and, thus, is prevented from sharing his or her ideas manifested as file modifications. In short, the first and second user are unable to collaboratively edit the file.

Collaboration, as the term is used herein, implies an ability for multiple clients to share ideas. This sharing includes the ability to automatically express one's ideas to the other members without having to have the other members explicitly solicit the ideas. Collaboration also includes the ability for each member to automatically receive any ideas from members who are transmitting ideas. Thus, at a minimum, collaboration implies communication among members that are party to the collaborative effort. This communication/collaboration may follow many models. A "brain-storming" session is an unrestrained model of collaboration. On the other hand, a "round-robin" model, in which each member has a specified turn to express ideas, is a constrained model of collaboration.

There is a need in the art for collaborative software. More particularly, there is a need in the art for software tools that allow collaboration functionality to be efficiently implemented into application programs, and for software tools that allow documents to be collaboratively accessed by multiple users in a collaborative session.

SUMMARY OF THE INVENTION

The invention provides a set of interrelated Shared Document Framework classes, which allow applications to create objects for manipulating a shared document that can be simultaneously accessed by multiple users in an interactive and real-time manner. A collaborator can thus view changes being made to the document by another collaborator as the changes are being made.

The Shared Document Framework provides a mechanism for each collaborator to obtain a replicated copy of the shared document in the collaborator's local address space, which copy is in synchronism with all other replicated copies of the shared document. In particular, a mechanism is provided for creating a document server which manages an original copy of the document and supplies the replicated copies to the collaborators.

Objects instantiated from the Shared Document Framework use a caucus system to distribute commands generated by each collaborator to all collaborator sites. Each collaborator session and the document server are caucus members. The caucus mechanism ensures global-ordering of the commands so that each caucus member receives the same sequence of commands. Upon receiving a command from the caucus, each caucus member (i.e., each collaborator session and the document server) apply the command to the document. Because only commands may change the state of the document, the replicated copies are assured of being in synchronism with the original. The caucus mechanism includes pause and resume caucus logic, which is used by the document server to supply replicated copies of the document to collaborators that are in synchronism with other existing copies.

In accordance with a preferred embodiment, when a command binding is sent to the caucus mechanism by a collaborator, the collaborator keeps a copy of the command binding. Each command binding received from the caucus mechanism is compared against this stored copy so that the collaborator can detect when its own command binding is echoed back from the caucus mechanism. When an echoed command binding is received, the stored original command is executed instead. This latter operation insures that any exceptions raised by the execution of the command binding are associated with the original command binding and not the echoed version.

BRIEF DESCRIPTION OF THE DRAWINGS

In the Drawing,

FIGS. 6A–C illustrate an exemplary state of the computing system after the original compound document and several copies are in existence.

DETAILED DESCRIPTION OF A PREFERRED EMBODIMENT OF THE INVENTION

Figure 1:
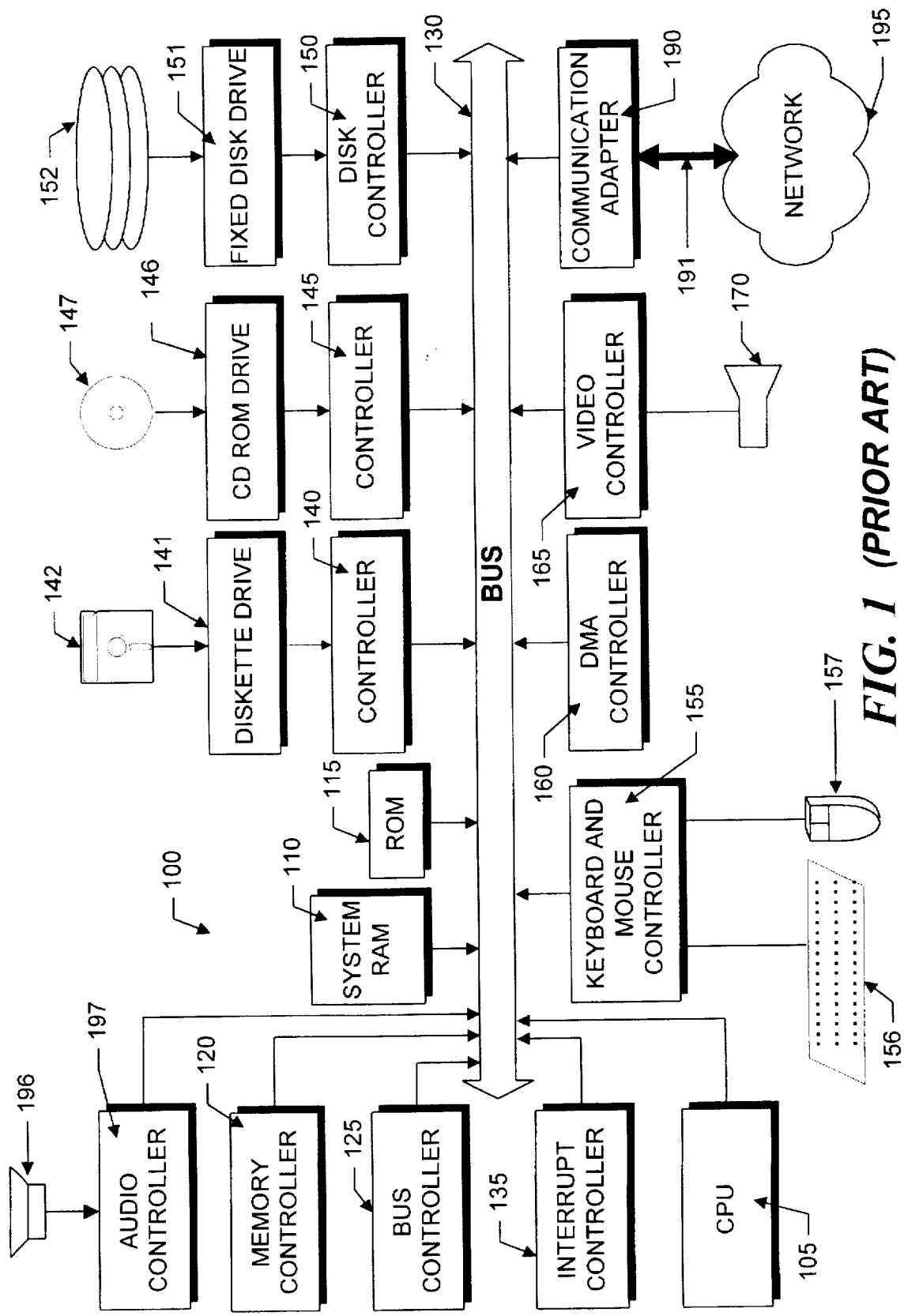
FIG. 1 is a schematic block diagram of a conventional computer system on which a preferred embodiment of the invention may execute.

The invention is preferably practiced in the context of an operating system resident on a personal computer such as the IBM® PS/2® or Apple® MACINTOSH® computer or on IBM computers utilizing the AIX operating system FIG. 1 illustrates the system architecture for a conventional computer system, such as a MACINTOSH® computer developed and sold by the Apple Computer Corporation, Cupertino, Calif. on which the inventive security system can operate. The exemplary computer system of FIG. 1 is for descriptive purposes only. Though the description below may refer to terms commonly used in describing particular computer systems, such as an Apple MACINTOSH® computer, the description and concepts equally apply to other systems, including systems having architectures dissimilar to FIG. 1.

The exemplary computer 100 includes a central processing unit ("CPU") 105, which may include a conventional microprocessor; a system random access memory ("RAM") 110 for temporary storage of information and a read only memory ("ROM") 115 for permanent storage of information. A memory controller 120 is provided for controlling system RAM 110; a bus controller 125 is provided for controlling bus 130; and an interrupt controller 135 is used for receiving and processing various interrupt signals.

Mass storage may be provided by a diskette 142, a CD-ROM disk 147 or a hard disk 152. The diskette 142 can be inserted into a diskette drive 141, which is, in turn, connected to bus 130 by a controller 140. Similarly, the CD-ROM disk 147 can be inserted into a CD-ROM drive 146, which is also connected by a controller 145 to bus 130. Finally, hard disks 152 are part of a fixed disk drive 151, which is connected to bus 130 by controller 150.

Input and output to computer system 100 are provided by a number of devices. For example, a keyboard and mouse controller 155 connects to bus 130 for controlling a keyboard input device 156 and a mouse input device 157. A DMA controller 160 is provided for performing direct memory access to system RAM 110. A visual display is generated by a video controller 165, which controls a video output display 170. The computer also includes a communications adapter 190 which allows the system to be interconnected to a local area network (LAN) or a wide area network (WAN) which is schematically illustrated by bus 191.

The computer 100 is generally controlled and coordinated by operating system software, such as the SYSTEM 7® operating system, available from Apple Computer Corporation, Cupertino, Calif. or the AIX operating system available from International Business Machines Corporation, Boca Raton, Fla. Conventional operating systems control and schedule computer processes for execution, perform memory management, provide file system, networking, and I/O services, and provide a user interface, such as a graphical user interface ("GUI"), among other things. User applications, such as editors and spread sheets, directly or indirectly, rely on these and other capabilities of the operating system.

In a preferred embodiment, the invention is implemented in the C++ programming language using object oriented programming techniques. As will be understood by those skilled in the art, Object-Oriented Programming (OOP) objects are software entities comprising data structures and operations on the data. Together, these elements enable objects to model virtually any real-world entity in terms of its characteristics, represented by its data elements, and its behavior, represented by its data manipulation functions. In this way, objects can model concrete things like people and computers, and they can model abstract concepts like numbers or geometrical concepts. The benefits of object technology arise out of three basic principles: encapsulation, polymorphism and inheritance.

Objects hide, or encapsulate, the internal structure of their data and the algorithms by which their functions work. Instead of exposing these implementation details, objects present interfaces that represent their abstractions cleanly with no extraneous information. Polymorphism takes encapsulation a step further. The idea is many shapes, one interface. A software component can make a request of another component without knowing exactly what that component is. The component that receives the request interprets it and figures out according to its variables and data, how to execute the request. The third principle is inheritance, which allows developers to reuse pre-existing design and code. This capability allows developers to avoid creating software from scratch. Rather, through inheritance, developers derive subclasses that inherit behaviors, which the developer then customizes to meet their particular needs.

A prior art approach is to layer objects and class libraries in a procedural environment. Many application frameworks on the market take this design approach. In this design, there are one or more object layers on top of a monolithic operating system. While this approach utilizes all the principles of encapsulation, polymorphism, and inheritance in the object layer, and is a substantial improvement over procedural programming techniques, there are limitations to this approach. These difficulties arise from the fact that while it is easy for a developer to reuse their own objects, it is difficult to use objects from other systems and the developer still needs to reach into the lower non-object layers with procedural Operating System (OS) calls.

Another aspect of object oriented programming is a framework approach to application development. One of the most rational definitions of frameworks come from Ralph E. Johnson of the University of Illinois and Vincent F. Russo of Purdue. In their 1991 paper, *Reusing Object-Oriented Designs*, University of Illinois tech report UIUCDCS91-1696 they offer the following definition: "An abstract class is a design of a set of objects that collaborate to carry out a set of responsibilities. Thus, a framework is a set of object classes that collaborate to execute defined sets of computing responsibilities." From a programming standpoint, frameworks are essentially groups of interconnected object classes that provide a pre-fabricated structure of a working application. For example, a user interface framework might provide the support and "default" behavior of drawing windows, scrolibars, menus, etc. Since frameworks are based on object technology, this behavior can be inherited and overridden to allow developers to extend the framework and create customized solutions in a particular area of expertise. This is a major advantage over traditional programming since the programmer is not changing the original code, but rather extending the software. In addition, developers are not blindly working through layers of code because the framework provides architectural guidance and modeling but at the same time frees them to then supply the specific actions unique to the problem domain.

From a business perspective, frameworks can be viewed as a way to encapsulate or embody expertise in a particular knowledge area. Corporate development organizations, Independent Software Vendors (ISV)s and systems integrators have acquired expertise in particular areas, such as manufacturing, accounting, or currency transactions as in our example earlier. This expertise is embodied in their code. Frameworks allow organizations to capture and package the common characteristics of that expertise by embodying it in the organization's code. First, this allows developers to create or extend an application that utilizes the expertise, thus the problem gets solved once and the business rules and design are enforced and used consistently. Also, frameworks and the embodied expertise behind the frameworks have a strategic asset implication for those organizations who have acquired expertise in vertical markets such as manufacturing, accounting, or biotechnology would have a distribution mechanism for packaging, reselling, and deploying their expertise, and furthering the progress and dissemination of technology.

Historically, frameworks have only recently emerged as a mainstream concept on personal computing platforms. This migration has been assisted by the availability of object-oriented languages, such as C++. Traditionally, C++ was found mostly on UNIX systems and researcher's workstations, rather than on Personal Computers in commercial settings. It is languages such as C++ and other object-oriented languages, such as Smalltalk and others, that enabled a number of university and research projects to produce the precursors to today's commercial frameworks and class libraries. Some examples of these are InterViews from Stanford University, the Andrew toolkit from Carnegie-Mellon University and University of Zurich's ET++ framework.

There are many kinds of frameworks depending on what level of the system you are concerned with and what kind of problem you are trying to solve. The types of frameworks range from application frameworks that assist in developing the user interface, to lower level frameworks that provide basic system software services such as communications, printing, file systems support, graphics, etc. Commercial examples of application frameworks are MacApp (Apple), Bedrock (Symantec), OWL (Borland), NeXTStep App Kit (NeXT), and Smalltalk-80 MVC (ParcPlace) to name a few.

Programming with frameworks requires a new way of thinking for developers accustomed to other kinds of systems. In fact, it is not like "programming" at all in the traditional sense. In old-style operating systems such as DOS or UNIX, the developer's own program provides all of the structure. The operating system provides services through system calls—the developer's program makes the calls when it needs the service and control returns when the service has been provided. The program structure is based on the flow-of-control, which is embodied in the code the developer writes.

When frameworks are used, this is reversed. The developer is no longer responsible for the flow-of-control. The developer must forego the tendency to understand programming tasks in term of flow of execution. Rather, the thinking must be in terms of the responsibilities of the objects, which must rely on the framework to determine when the tasks should execute. Routines written by the developer are activated by code the developer did not write and that the developer never even sees. This flip-flop in control flow can be a significant psychological barrier for developers experienced only in procedural programming. Once this is understood, however, framework programming requires much less work than other types of programming.

In the same way that an application framework provides the developer with prefab functionality, system frameworks, such as those included in a preferred embodiment, leverage the same concept by providing system level services, which developers, such as system programmers, use to subclass/override to create customized solutions. For example, consider a multi-media framework which could provide the foundation for supporting new and diverse devices such as audio, video, MIDI, animation, etc. The developer that needed to support a new kind of device would have to write a device driver. To do this with a framework, the developer only needs to supply the characteristics and behavior that is specific to that new device.

The developer in this case supplies an implementation for certain member functions that will be called by the multi-media framework. An immediate benefit to the developer is that the generic code needed for each category of device is already provided by the multi-media framework. This means less code for the device driver developer to write, test, and debug. Another example of using systems framework would be to have separate I/O frameworks for SCSI devices, NuBus cards, and graphics devices. Because there is inherited functionality, each framework provides support for common functionality found in its device category. Other developers could then depend on these consistent interfaces to all kinds of devices.

A preferred embodiment takes the concept of frameworks and applies it throughout the entire system. For the commercial or corporate developer, systems integrator, or OEM, this means all the advantages that have been illustrated for a framework such as MacApp can be leveraged not only at the application level for such things as text and user interfaces, but also at the system level, for services such as graphics, multi-media, file systems, I/O, testing, etc.

Application creation in the architecture of a preferred embodiment will essentially be like writing domain-specific puzzle pieces that adhere to the framework protocol. In this manner, the whole concept of programming changes. Instead of writing line after line of code that calls multiple API hierarchies, software will be developed by deriving classes from the preexisting frameworks within this environment, and then adding new behavior and/or overriding inherited behavior as desired.

Thus, the developer's application becomes the collection of code that is written and shared with all the other framework applications. This is a powerful concept because developers will be able to build on each other's work. This also provides the developer the flexibility to customize as much or as little as needed. Some frameworks will be used just as they are. In some cases, the amount of customization will be minimal, so the puzzle piece the developer plugs in will be small. In other cases, the developer may make very extensive modifications and create something completely new. In a preferred embodiment, as shown in FIG. 1, an application program resident in the RAM 110, and under the control of the CPU 105, is responsible for managing various tasks using an object oriented document framework.

A preferred embodiment of the instant invention is implemented as a system-level application framework. A system-level framework is part of the platform image and library set, rather than being compiled into the application image. In this fashion, applications executing on the system can share the use of the framework components, rather than having the framework components replicated in each application's image.

Figure 2:
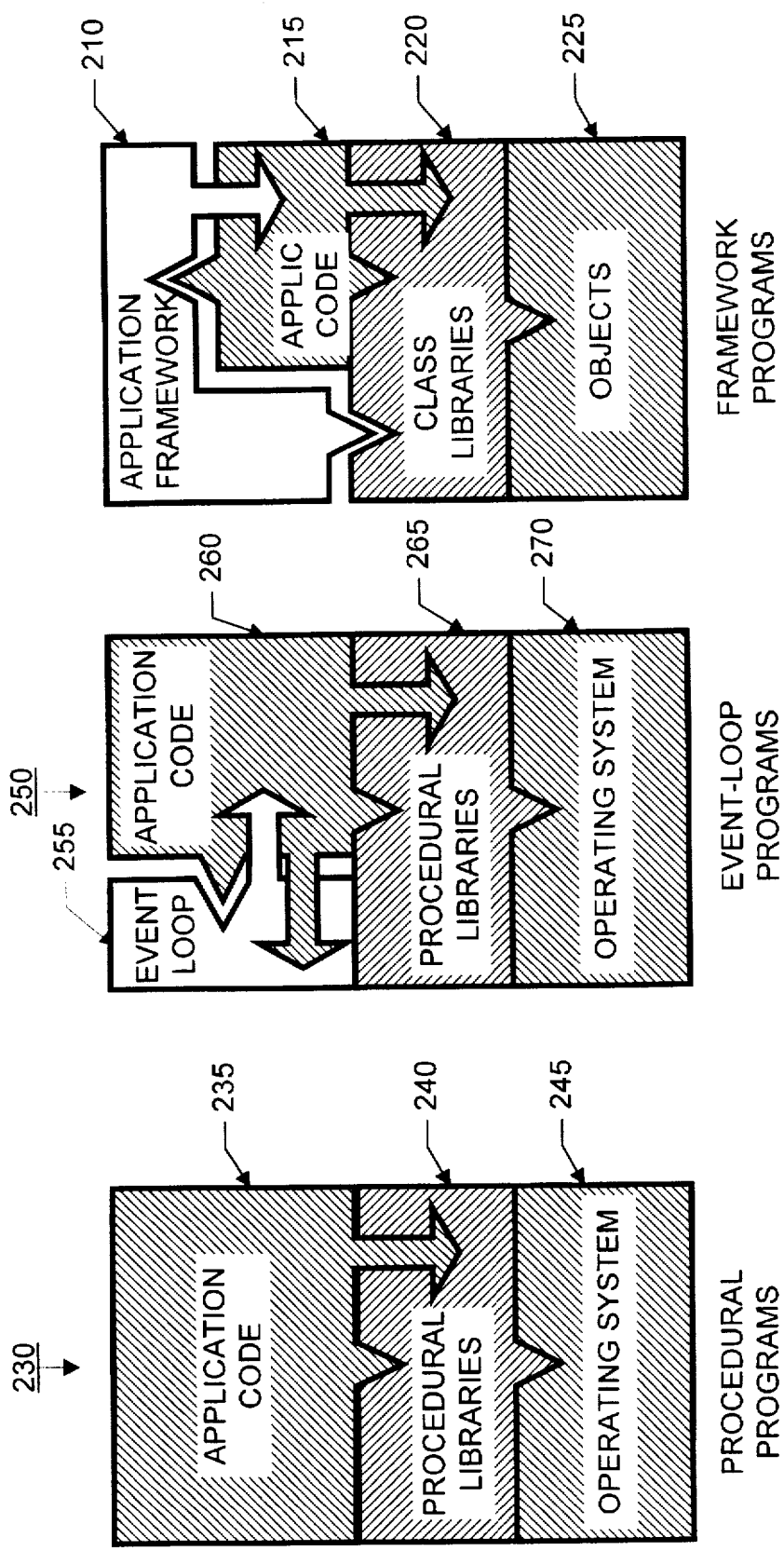
FIG. 2 is a schematic illustration comparing conventional programming techniques with framework-style programming.

FIG. 2 helps explain the distinctions between an application framework 210 and the more conventional techniques of procedural programming 230 and event-loop, reactive programming 250. In procedural programming, the underlying application 235 can call procedures in libraries 240 provided by and layered on top of the operating system 245. The procedures provided by library 240 perform commonly encountered operations. The application program 235 has a sequential flow of control, which is understood by skilled artisans upon reviewing source code descriptions of the application.

In procedural programming, the programer is responsible for dictating the overall behavior and flow of control of the application. The system components, e.g., the procedural libraries 240 and operating system 245, provide only fine-grained capabilities. The libraries 240 and operating system 245 have no information about a program's code 235 or its behavior.

Event-loop programming 250 has a different paradigm of control than procedural programming and is usually associated with the development of graphical user interfaces ("GUIs"). Under the event-loop paradigm, a portion of code known as an event loop 255, in effect, monitors a predefined set of events, such as mouse or keyboard actions. In response to detecting such events, the event loop 255 invokes different portions of an application program 260. In some systems, e.g., X Windows, these portions of the application program are known as "callback procedures." Unlike procedural programming 230, the application code 260 does not determine the flow of control. Rather, the flow of control depends on random user actions, which are detected by the event loop 255. The application program 260 "reacts" to events detected by the event loop 255. The individual pieces, e.g., callback procedures, of the application program 260 may call procedural libraries 265. The procedures in the libraries 265 are similar to those of libraries 240. Similarly to procedural programs 235, the application code 260 in the event-loop paradigm is layered on top of the libraries 265 and operating system 270. Event-loop programming requires application developers to write a substantial amount of code. This is so, because the event-loop 255 detects events only and does not provide behavior. These events must then be interpreted by the application code 260. That is, like the case of procedural programming, in event-loop programming, the application developer is still responsible for dictating the overall behavior of the overarching application.

The concept of an application framework 210 carries the event-loop concept 250 further. In short, an application framework 210 provides a set of generic capabilities and predefined behavior. The application developer uses application code 215 to replace some of the generic capabilities of the framework 210 with specific capabilities of the application code 215. For example, the application framework 210 may provide a robust set of user interface behavior, including a predefined set of windows, menus, and dialogs. The particular application may only need to customize one of the general aspects of the framework 210, such as a particular arrangement in one of the windows. Because the framework's generic capabilities, for the most part, satisfy the application's needs, the application developer needs only replace that one aspect of the framework 210 with code 215, while retaining the other aspects of framework 210. Using the object-oriented techniques discussed above, this replacement may be performed, for example, by creating new subclasses derived from the classes provided by the framework 210 and the class libraries 220 and by exploiting polymorphism. The application code-provided subclass information would then provide the particular capabilities sought by the application. In addition, particular capabilities of an application may also be achieved by the application code 215 appropriately instructing the generic capabilities provided by the framework 210 by getting and setting information from objects 225 created from the framework 210 and class libraries 220, for example.

More particularly, if the application code 215 supplements the generic capabilities of framework 210 by providing new subclasses derived from the framework provided classes, a well behaved combination of framework 210 and code 215 will be capable of using the new subclasses by exploiting polymorphism. (The general concept of polymorphism is known.) In short, polymorphism, among other things, allows for the run-time selection of a member function to be invoked based on the class of the invoking object. Consequently, the application can use a new class and invoke a member function therefrom and be assured that the desired behavior results. That is, the member function from the new subclass, not the parent class, may be correctly invoked, and the new subclass and instances created therefrom will correctly operate with the framework classes. No recompiles of the framework 210 or libraries 220 are needed. When objects created from the new subclass are involved, invocations of member functions of objects created from the new subclass will be properly selected, during the runtime execution, as a result of the polymorphism.

A preferred embodiment of the inventive Shared Document Framework uses known aspects of the Common-Point™ Application System, sold by Taligent, Inc., of Cupertino, Calif. The CommonPoint Application System provides a pervasive set of interrelated and interdependent system-level frameworks, extending through all aspects of application and system software, i.e., not just GUIs. These frameworks are described in various publications, including the following user manuals, which are hereby incorporated by reference in their entirety: *AN INTRODUCTION TO THE COMMONPOINT APPLICATION SYSTEM* (1995), *DISTRIBUTED COMPUTING* (1995), *OS SERVICES* (1995), *PROGRAMMING WITH THE PRESENTATION FRAMEWORK: TUTORIAL* (1995), and *DESKTOP FRAMEWORK CONCEPTS* (1995).

More particularly, a preferred embodiment of the Shared Document Framework utilizes a Caucus Framework, which is described in U.S patent application Ser. No. 08/667,179, entitled CAUCUS FRAMEWORK FOR PROVIDING BROADCAST COMMUNICATION CAPABILITIES TO CLIENTS, filed on Jun. 20, 1996, now abandoned, which is also hereby incorporated by reference in its entirety including, in particular, pages 12–32 and Appendix A. As will be explained in more detail below, the Caucus Framework is utilized with a Compound Document Framework ("CDF"), provided by the CommonPoint Application System. The Caucus Framework supports the communicative aspects underlying the collaboration, and as will be explained below, allows multiple collaborators to simultaneously and interactively manipulate a compound document in real-time.

The CDF and Caucus Framework are described below to the extent that they are material to understanding a preferred embodiment of the instant invention. Skilled artisans will appreciate that, although the preferred embodiment is described with reference to the CDF and the Caucus Framework, the invention transcends these Frameworks and is not limited to their use.

I. The CDF

The CDF is a set of known interrelated and interdependent classes that allow a client application to construct and manipulate compound documents having multiple data object types. When using the CDF, a compound document may be created by constructing an instance of a TCompoundDocument class, (hereinafter an instance of TCompoundDocument is referred to as a "compound document.").

A compound document is a container that embeds multiple types of data objects, such as text objects, graphic objects, etc., or embeds references to such data objects. (The general concepts of containers and "embedding" data are known).

The CDF is polymorphic and supports "native" and "foreign" embeddable data objects. A native data object is created from a CDF-provided data class, such as TText and TGraphic. A foreign data object is created from an application-provided data subclass, derived from a CDF-provided classes. (The general concept of deriving a subclass is known).

Each embeddable component is a "document component," which includes a model and a presenter state. For example, a document component may be a cylinder graphic data type that is transformed to appear as a cone. The model specifies what is embedded, e.g., a cylinder. The presenter state indicates how the model should be transformed to be presented to the end user, e.g., transform information that modifies the cylinder into a cone.

One of the interrelated frameworks used with the CDF is a Selection Framework. The Selection Framework provides a set of selection classes from which selection objects may be created (hereinafter selection objects are referred to as "selections"). A selection may specify the entire document or portions of a document. For example, a text-specific selection may specify a subset of the text data, such as a text range, e.g., characters 5 through 10. In short, selections specify a portion of the compound document that is of interest and provide an access interface to the model or the presentation state of that portion.

Another of the interrelated frameworks used with the CDF is a Command Framework. The command framework provides a set of command classes from which command objects may be created and from which new application-specific subclasses may be derived. For example, an editing application will only use editing commands, and no other mechanism, to modify the content of a compound document. The editing command classes, used to create the editing command objects, are provided by the editing application.

The command framework supports atomic and incremental commands. An exemplary incremental command is dragging a cursor, which needs incremental input from a mouse, specifying how an entity is being dragged with the mouse. Because incremental commands need multiple input events to define the overall command, incremental commands require state processing to track the overall command. The CDF and Command Framework support such incremental command semantics, as will be further explained below.

A command encapsulates a change to a "target." For many commands, the target will be a selection, for example, specifying a portion of a compound document. However, targets may also include other targets and other mechanisms. A "command binding" is a command and selection pair. (hereinafter "commands" refer to command objects and command bindings). Well behaved applications use only command objects to operate on a document.

II. The Caucus Framework

The Caucus Framework provides a set of interrelated interface and agent classes, which provide application programs the ability to have clients communicate with each other according to a reliable, closed, network-independent, globally-ordered broadcast. "Closed" means that only caucus members receive the broadcast and only caucus members may send to the caucus. "Globally-ordered" means that each caucus member receives the same sequence of messages that are broadcast by the caucus. The Caucus Framework does not interpret the content of any messages transmitted via the caucus. Instead, any meaning is supplied by the application's interpretation of the broadcast.

Clients interact with a caucus via interface instances created from the interface classes. For example, the Caucus Framework includes a TStandardCaucusMember class, from which Member instances may be instantiated. When an instance of TStandardCaucusMember is created, the constructor member function sends a join message to an associated caucus agent (described in more detail below). This message causes the agent to assign a unique caucus identity to that Member instance, to register that identity in conjunction with that Member's location on the network, and to return the assigned identity to the Member instance so that it may record its identity for use by the client.

The Caucus Framework also includes a TSendMessage class and a TReceiveMessage class, from which clients may create Send Message and Receive Message instances. These instances are used for communicating with the caucus. In short, to send a message to the caucus, a client must, first, as discussed above, be a caucus member and, second, use a Send Message instance. The client creates the instance, streams a message into the instance, and then destroys the instance. The Send Message instance, and particularly its destructor member function, cooperates with the Member instance to cause the message to be sent to the caucus agent when the Send Message instance is destroyed. As will be discussed below, the caucus agent receives the message and then broadcasts the message to other members. The specific cooperation details between the Send Message instance and the Member instance need not be understood to understand the instant invention, but nonetheless may be found U.S. patent application Ser. No. 08/667,179 and reference manuals, filed on Jun. 20, 1996, now abandoned. Read Message instances are used analogously, except that clients stream messages from, rather than to, a Read Message instance.

The Caucus Framework provides a concrete agent class, TStandardCaucusTransponder. The overarching application creates a Transponder instance from the TStandardCaucusTransponder and publishes the instance as a service on the computing system. As is known, "publishing" allows other software to use the service via an associated service reference. The Transponder provides a registry for assigning and managing caucus identities, discussed above. In addition, the Transponder includes logic for receiving messages sent by the Members and for broadcasting them to all of the caucus members in global order. The Transponder also includes logic for pausing and resuming the caucus so that clients may synchronize a caucus.

A client may send a pause message to a caucus agent by invoking a pause() member function on its Member instance. The pause message is received by the Transponder and broadcast to all members. Upon broadcasting the pause message, the Transponder agent stops broadcasting any other messages until it receives a resume message from the member that initiated the pause. Messages may still be received, but the Transponder internally queues the messages.

Resume messages are automatically sent by a Member in response to a client invoking a resume() member function associated with the Member instance. Upon receiving the resume message, the Transponder resumes broadcasting messages.

The Transponder cooperates with an underlying network transport mechanism to receive messages by a member and to broadcast such received messages to all members. A service definition to the network transport mechanism is supplied as part of the transponder construction operation.

When members send a message to the caucus, they actually send the messages to a caucus service (more below). In short, the caucus members are supplied with the caucus service definition during the construction of the member instances. This service is then referenced by the Member instances when communicating with the Transponder.

Detailed class definitions for the above classes, their use, and their interaction may be found in the reference manuals and in U.S. patent application Ser. No. 08/667,179, filed on Jun. 20, 1996 now abandoned.

Figure 3:
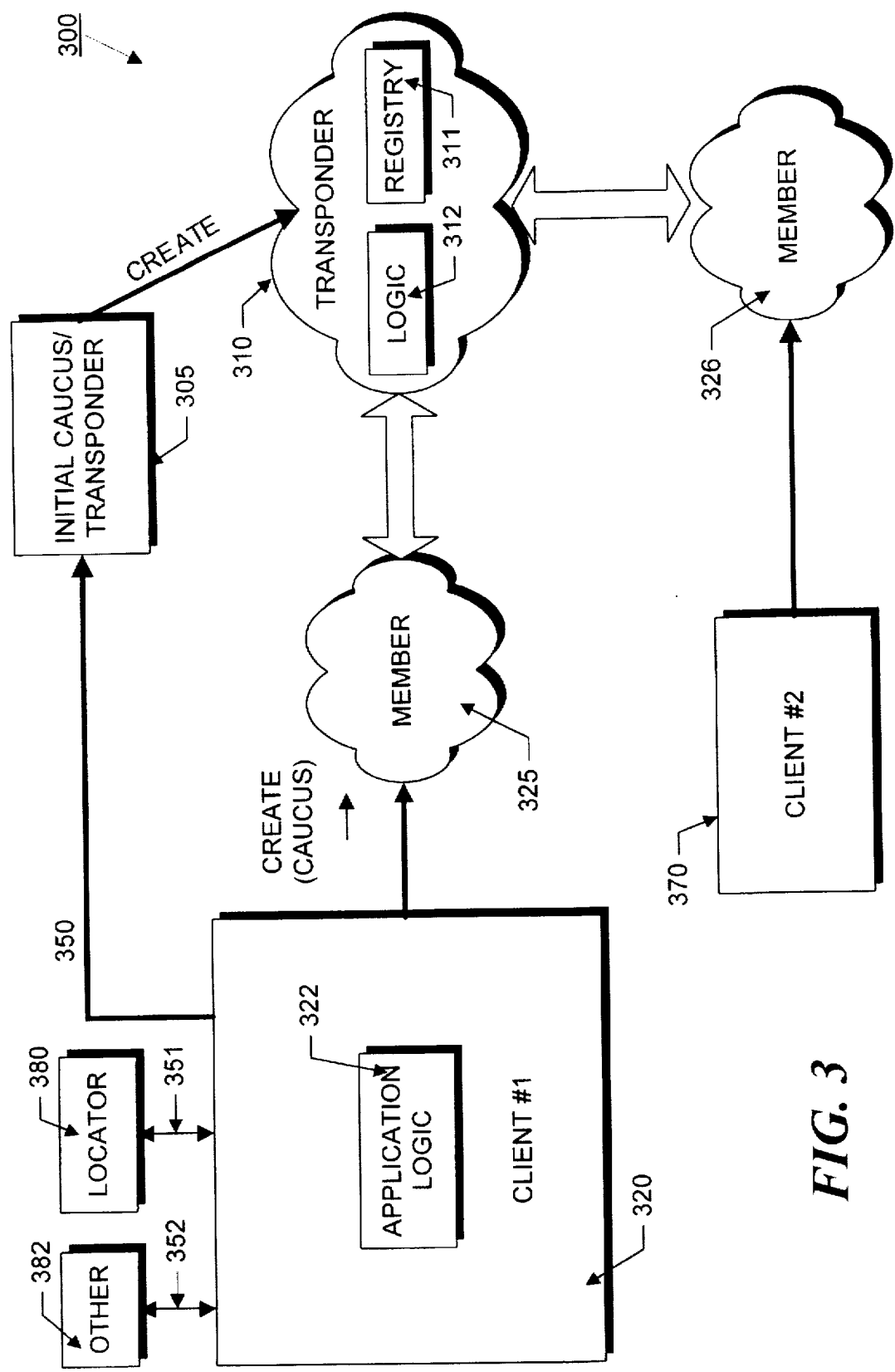
FIG. 3 is a schematic diagram illustrating the creation of the caucus architecture by means of the member and transponder objects.

The overall architecture of a hypothetical system using the Caucus Framework is illustrated in FIG. 3. The overarching hypothetical system 300 includes initialize caucus/transponder logic 305 and clients 320 and 370. The system 300 further includes Member instance 325, and Transponder agent instance 310, as well as any corresponding instances, such as Member instance 326, associated with other clients, e.g., 370.

The clients 320, 370 and the initial caucus logic 305 are application dependent. For example, as will be further explained below, the clients 320 and 370 may be collaborating editing applications. Each client uses the caucus and interprets the messages broadcast by the caucus.

The Member and Transponder instances are used by the application, but are at least partially Caucus Framework dependent, as their eventual image is dictated by the class definition provided by the Caucus Framework. These instances are considered "part of" the overall system in that they reside in the system's address space (at least the instance-specific portions, such as object attributes, reside there). This system address space might, for example, be the address space of the operating system. The Member instances, 325 and 326 are found in the application address space of a particular client, e.g., 320 or 370, and the Transponder instance 310 is found in the application address space of the init caucus logic 305, in the above example.

As outlined above, these instances may be instantiated from classes provided by the Caucus Framework and thus be completely dependent upon the Caucus Framework. Alternatively, these instances may be instantiated from application-defined subclasses of the Caucus Framework classes, in which case they are partially dependent on the overall system 300 and partially dependent on th˜ Caucus Framework. The class definitions for the Caucus Framework provided classes exist in system libraries, residing in the system address space of the machines having the clients, e.g., 320, and the init logic 305. For example, the class definitions might reside in class libraries 220 of FIG. 2.

Each of the clients 320 and 370 contains application logic which controls the operation of the client. For example, client 320 is illustrated as containing application logic 322. As arrows 350-2 indicate, application logic 322 may invoke the init logic 305, using a conventional locator service 380, or use some other mechanism 382 to identify the caucus to which the client will be a member. That is, the Caucus Framework does not dictate or constrain how the existence of the caucus service is communicated to the clients.

Init logic 305 creates a Transponder instance 310 from a TStandardCaucusTransponder class definition, for example. As outlined above, the transponder manages caucus identities, receives messages from the members, broadcasts messages to all caucus members in global order, and pauses and resumes the caucus. The application logic also constructs the Member instance 325. The identified Caucus is passed as a service reference parameter in constructing the Member instance 325 in a memory of the computing system upon which the client executes, from the TStandardCaucusMember class, for example.

Figure 4:
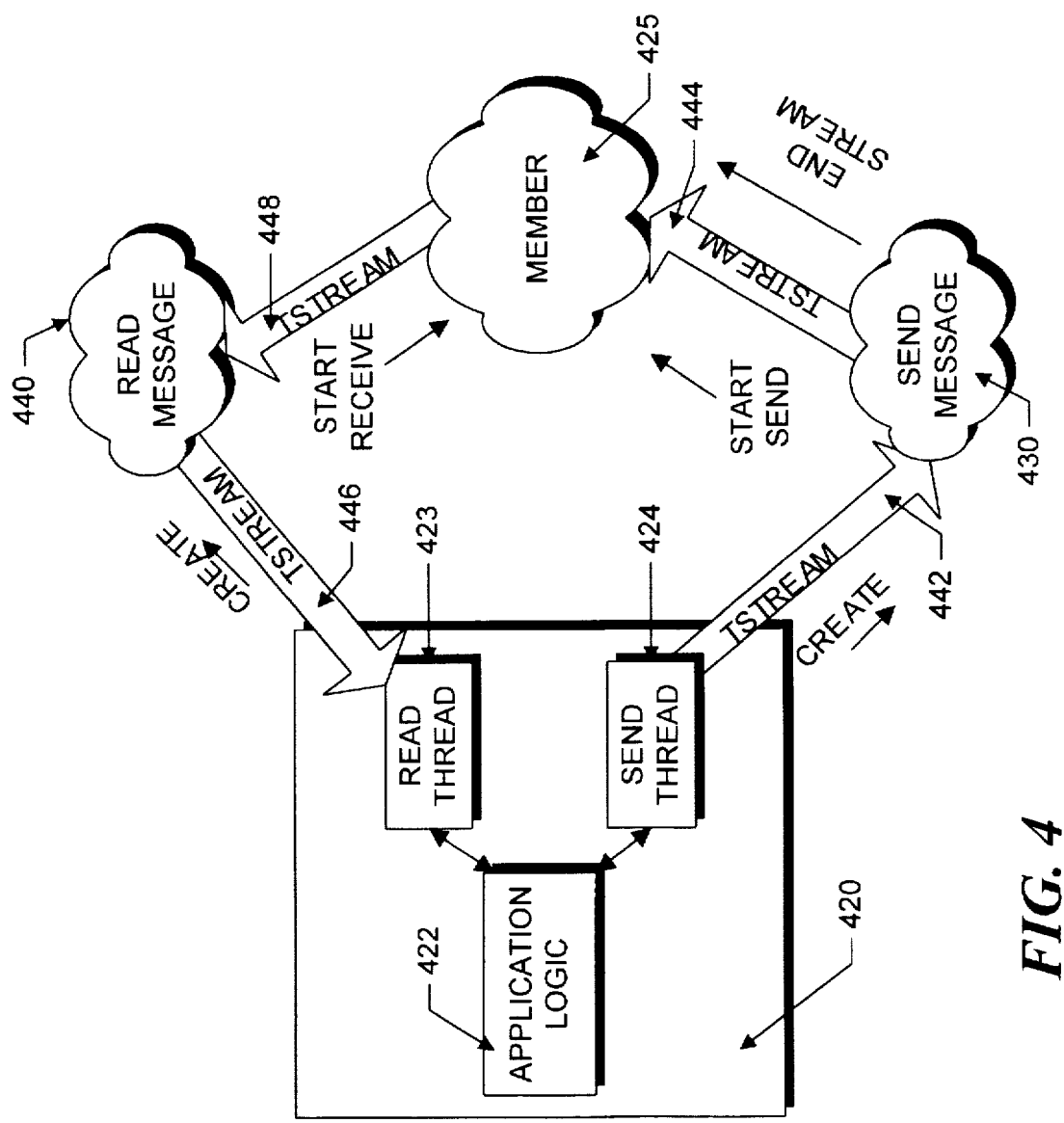
FIG. 4 is a schematic diagram illustrating read and send message objects and accompanying data streams used by an application program to communicate with its caucus member object.

As illustrated in FIG. 4, a client 420 typically includes, in addition to the application logic 422, a read thread 423, and a send thread 424. The logic 422 implements the semantics of the client by, among other things, interpreting messages broadcast by the caucus. The send thread 424 includes logic for creating Send Message instances from a TSendMessage class, for example.

A Send Message instance, such as instance 430, cooperates with the Member instance 425 to send messages to the caucus agent, i.e., Transponder 310 (FIG. 3). In particular, the send thread 424 creates a Send Message instance 430 and then streams data to it via a TStream data stream 442. As discussed in the aforementioned U.S. patent application Ser. No. 08/667,179, filed on Jun. 20, 1996 now abandoned, the send thread then destroys the Send Message instance 430 and the destructor of the Send Message instance 430 streams the data to the Member instance 425 via a TStream object 444.

Likewise, the read thread 423 creates Read Message instances. Each Read Message instance, such as instance 440, operates with the Member instance 325 to receive messages that are broadcast from the Member instance 325. For example, read thread 423 creates Read Message instance 440 into which data is streamed, via TStream object 448. Read Message instance 440 is then destructed and the destructor streams the data via TStream object 446 to read thread 423.

III. The Shared Document Framework

The inventive Shared Document Framework allows application programs, using the Framework, to construct and manipulate documents, such as compound documents, to not only be shared by multiple users but to be collaboratively accessed by multiple users, interactively and in real-time. Each collaborator may make changes to the shared document, and have those changes automatically reflected to the other collaborators; that is, each collaborator sees the changes made by another collaborator as the changes are being made (if both collaborators are observing the same portion of the document.) To do this, the Shared Document Framework of a preferred embodiment utilizes the Caucus Framework, summarized above, along with particular aspects of the CDF.

In short, the Shared Document Framework provides support mechanisms for the following model of collaboration. Each collaborator receives a replicated copy of the document that is being shared and operates on it locally. The received copy is in synchronism with all other copies. Any commands that can change the state of the document are broadcast to all collaborators in global order, at which time the collaborators apply the commands to their associated local, replicated copies. Because each collaborator starts with a copy of the document that is in synchronism with the others, and because each collaborator applies an identical sequence of commands to their local copy, each collaborator remains in synchronism with the others.

More particularly, the material aspects of the TCompoundDocument class definition, from which shared document instances are created, are defined below. The TCompoundDocument class includes other interface member functions, which are known, but these aspects of the class definition are immaterial to understanding the instant invention.

```
class TCompoundDocument : public TBasicDocument
{
public:
        TCompoundDocument(TModel *rootModel,
            TModelPresenterState *rootState);
//inherited from TBasicDocument of CommonPoint Application System
virtual void    AdoptAndDo (TCommandBinding *);
virtual void    AdoptAndDo
(TAbstractDocumentComponentCommandBinding *);
virtual void    DoBegin
(TAbstractDocumentComponentCommandBinding&);
virtual void    DoIncrement
(TAbstractDocumentComponentCommandBinding&);
virtual void    AdoptAndDoEnd
                    (TAbstractDocumentComponentCommandBinding&);
protected:
virtual void    FileIn(TMultiBinStorageMechanism&);
virtual void    FileOut(TMultiBinStorageMechanism&);
}
```

The FileIn and FileOut logic are described below, followed by a description of the command processing aspects. In short, the FileIn and FileOut logic are responsible for retrieving and storing a local replicated copy of the document that is being shared. The command processing interface works with associated agents to ensure that commands are globally broadcast to each collaborator.

More specifically, the FileIn() member function includes logic to create a shared document instance that is associated with a file. As part of an "open file" operation, the client code first creates an instance of TCompoundDocument, locally, and then invokes the FileIn member function with a desired file name.

Figure 5A:
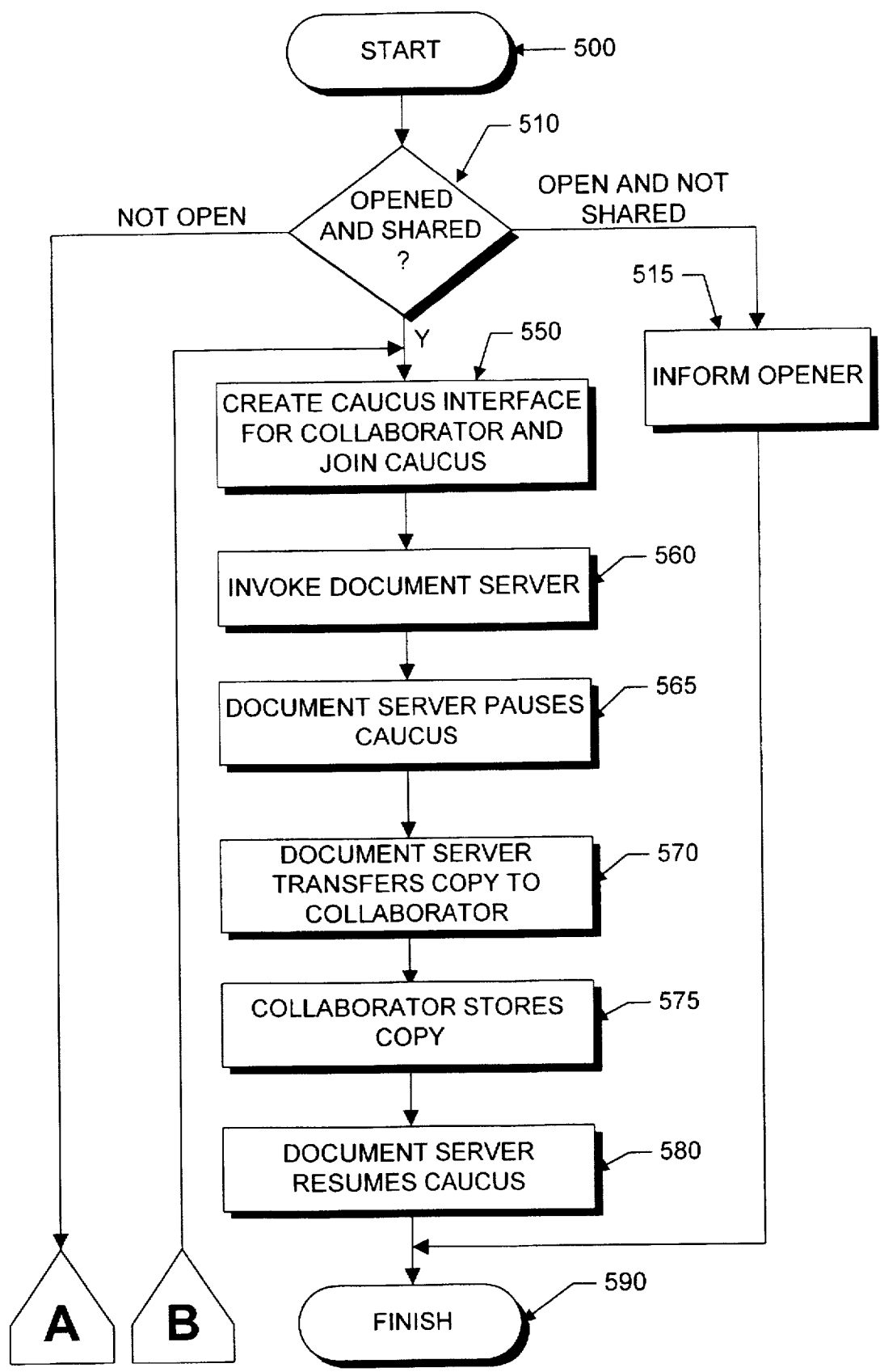
FIGS. 5A–B when placed together form an illustrative flowchart showing the file-in logic of a preferred embodiment.
Figure 5B:
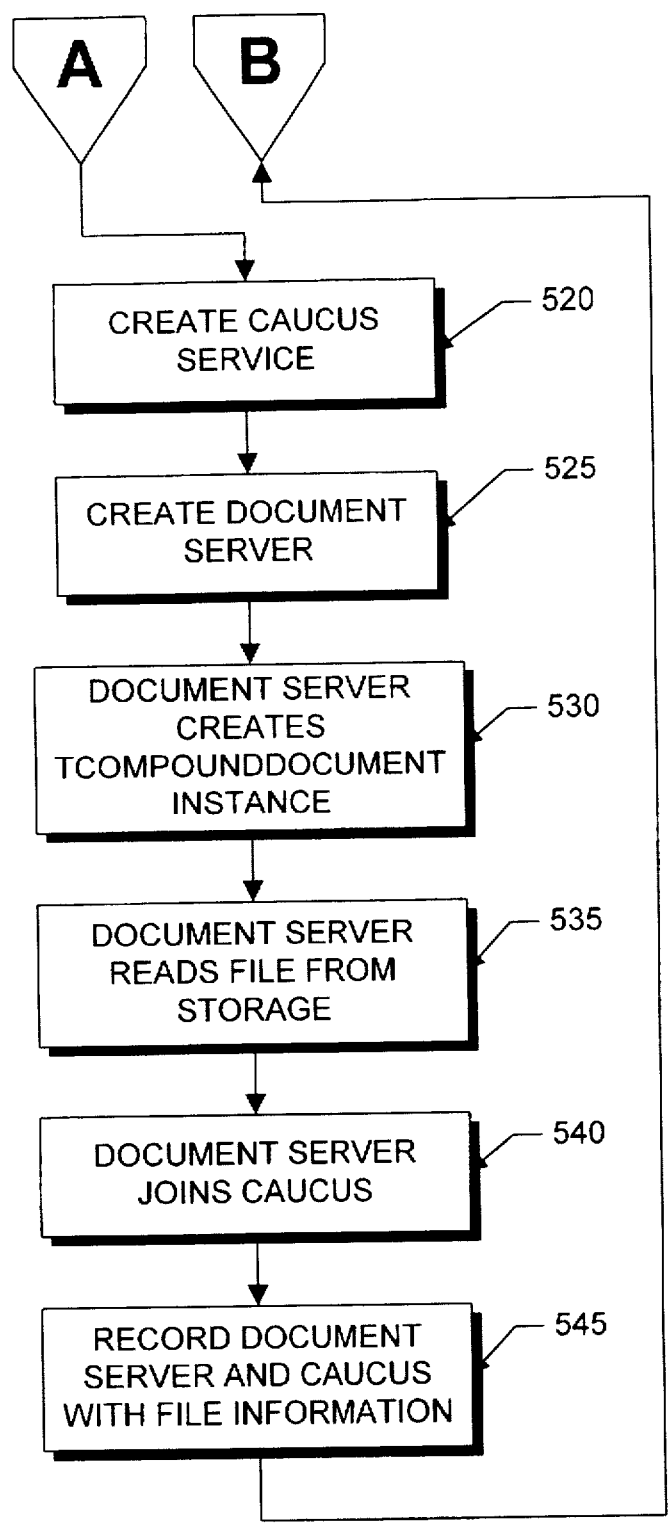

Referring to FIGS. 5A-B, the FileIn logic starts at step 500 and proceeds to step 510 where it determines whether this shared document is already opened by another and in sharing mode.

If the file is opened but sharing mode is disabled, the FileIn logic proceeds to step 515, where it informs the client that the file that it is opened in non-sharing mode. The logic then proceeds to step 590, which ends the process.

If the file is not open yet, the logic proceeds to step 520 (FIG. 5B), where a caucus service is created. As discussed above, this involves creating a transponder agent and publishing it on the computing system as an available service. Locator services or similar mechanisms may be used to identify a network transport service to pass in as a service definition to create the transponder agent. The logic proceeds to step 525, where a document server is created. The document server includes conventional file transferring logic for reading files from storage and for sending copies of files over a network, if necessary. The document server also includes logic for interacting with compound document instances, as will be further described below. The logic proceeds to step 530 where the document server creates an instance of TCompoundDocument. Then, in step 535, the document server reads the requested file from storage into memory, using conventional techniques. This is the "original" copy of the document. In step 540, the FileIn logic creates the necessary caucus interface instances for the Document server and causes the document server to join the caucus. In step 545, the caucus service and the document server are recorded with the file information, residing on the computing system. The logic then proceeds to step 550 (FIG. 5A), which is also the starting point for requests to open a file that is already open and in sharing mode (as detected by step 510).

In step 550, the FileIn logic creates the necessary caucus interface instances for the collaborator, i.e., the application opening the file, and causes the collaborator to join the caucus. The caucus service was previously stored with the file information (step 545), and this is used to create the necessary service references to create the Member instance, for example. Creating the interface classes causes the collaborator to join the caucus.

In step 560, the logic causes the document server to be invoked to request a copy of the document. In step 565, the document server pauses the caucus using its member instance's pause() member function, thus stopping any updates to the document as commands are paused from being broadcast.

In step 570, the document server transfers a copy of the original document to the collaborator using conventional file transfer techniques. In step 575, the collaborator stores the copy locally, thus making a local, replicated copy of the document associated with its local instance of TCompoundDocument. (This instance was created by before invoking the FileIn logic as discussed above; i.e., the FileIn() logic cannot be invoked until the TCompoundDocument instance is constructed).

After the document server has transferred the document, the document server resumes the caucus, in step 580, by invoking the resume() member function of its Member instance. The logic ends in step 590, at which point both the collaborator and the document server are registered caucus members and at which point both the collaborator and document server have copies of the document that are in synchronism. Each is ready to receive and apply commands, as will be discussed below.

Moreover, as is seen in the logic branch starting at step 550, any subsequent members are assured of receiving a replicated, synchronous copy of the document, even if changes are made to the document before the subsequent member opens the shared document. The subsequent member will attain a local copy including any of the changes made by the session, as the document server updates the original with any of the changes.

Figure 6B:
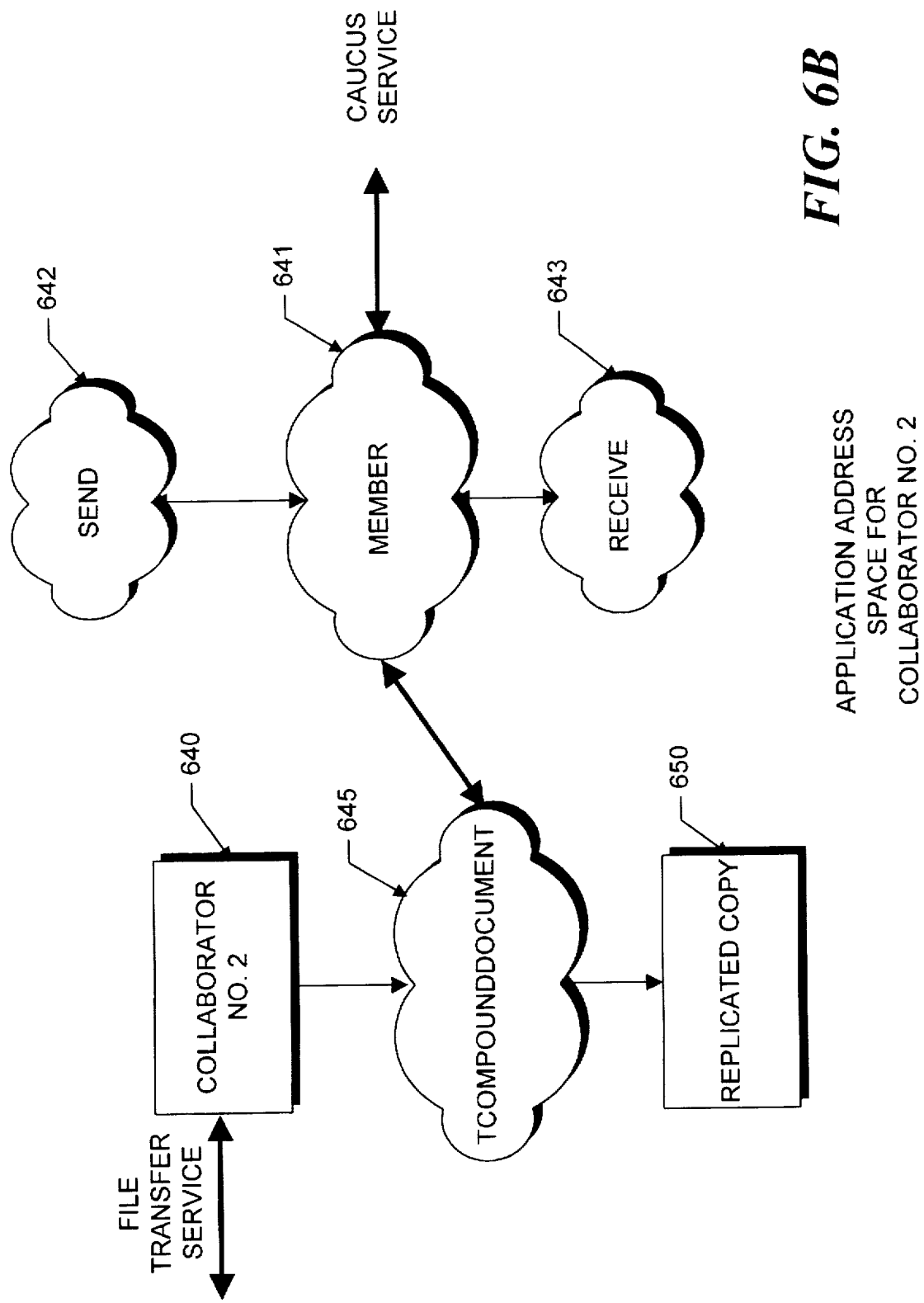
Figure 6C:
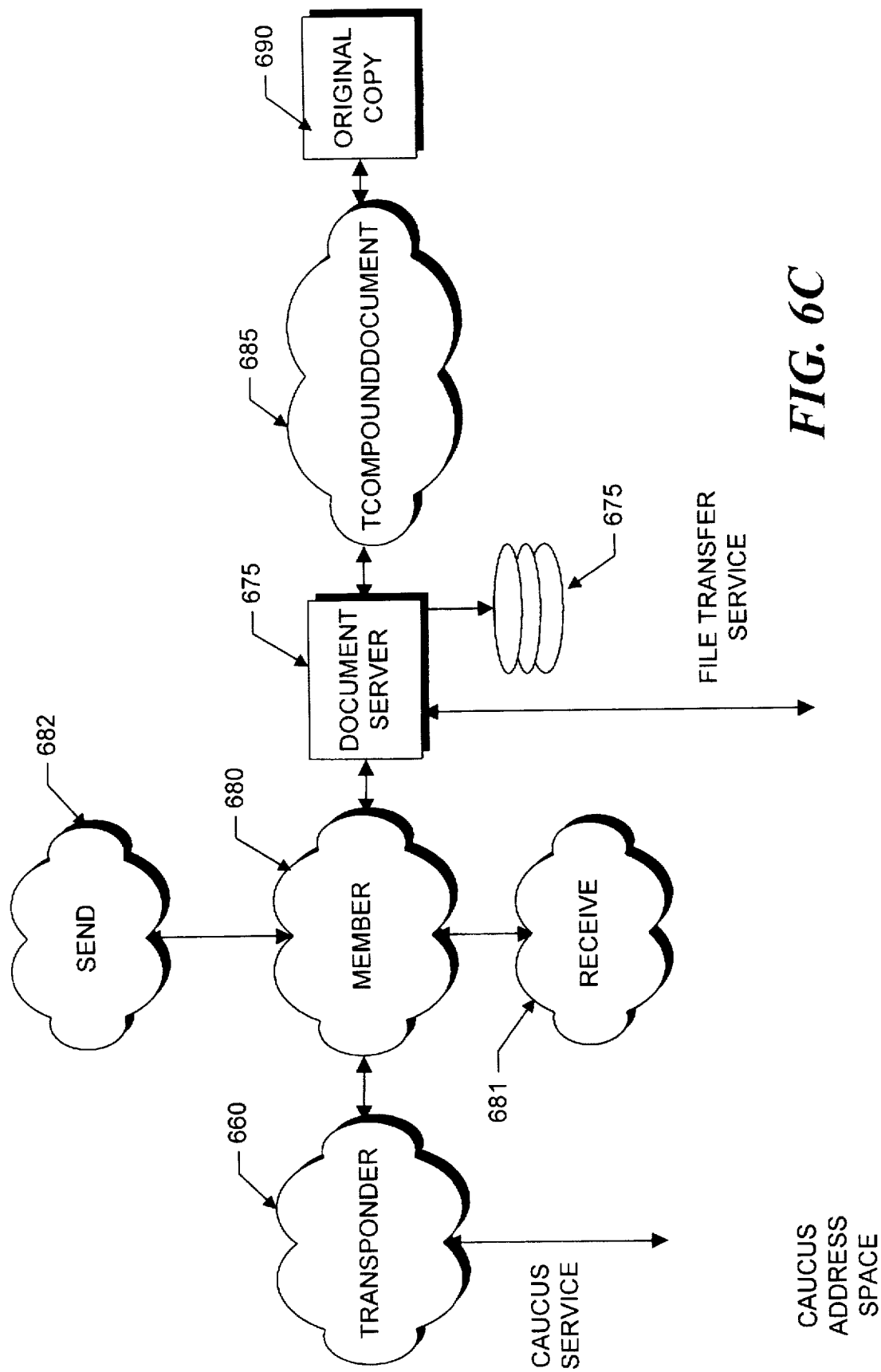

FIGS. 6A–C illustrate an exemplary state of the computing system after two collaborators have opened the shared document. Referring to FIG. 6A, first collaborator 610 has a local replicated copy 620 of the document, with which collaborator 610 interacts, via the interface defined by TCompoundDocument instance 615. Instance 615 includes logic for transferring files with a file transfer service, and collaborator 610 includes caucus interface instances 630-2 for communicating to the caucus. These entities reside in the application address space for the first collaborator application.

FIG. 6B illustrates an identical arrangement for the second collaborator 640. These entities, however, reside in an application address space for the second collaborator. This address space may exist on the same machine as used by the first collaborator 610 or may even exist on a different computing node of the overarching computing system. Although only two collaborators are illustrated, the collaboration may involve many more collaborators than shown above.

FIG. 6C illustrates the transponder and document server arrangement. Transponder agent 660 includes a member registry and broadcast logic, discussed above. Document server 675 is a member of the caucus and communicates with the transponder 660 via caucus interface instances 680-2. Document server 670 includes logic for obtaining the data for the original copy from storage 675 and for managing the original copy of the document 690, and communicates with copy 690 via an instance of TCompoundDocument 685. The Transponder 660 is the caucus service and the document server 690 is the file transfer service. The above components reside in a separate caucus address space.

Actual command processing and distribution may involve many details, such as command logging and other ancillary features, that are immaterial to understanding the instant invention. Those aspects that are material are discussed below.

As outlined above, command processing involves operation with command bindings which encapsulate both an action to be performed and a target for that action. The targets, in turn, may be selections, which, as outlined above, specify a portion of the compound document of interest. The selections used by a preferred embodiment are address-space and architecture-independent. This is so, because the various collaborators may reside in different address spaces, and even on different nodes within a computing system network. Each node may involve a different architecture. For example ASCII machines use 8 bits to represent one character, but EBCDIC machines use only 7 bits per character. Each machine definitely involves a different address space. Address-independent selections abstract and hide these details. Thus, selections will not use C pointers and the like, and instead will specify portions of the document relatively and abstractly, for example, "the tenth text character object through the 15 text character object."

The TCompoundDocument class provides a known, predefined command processing interface. In particular, the interface includes an AdoptAndDo(), a DoBegin(), a DoIncrement, a Do(), and an AdoptAndDoEnd() member function. Each member function is used in particular contexts, known in the art, and defined by the CommonPoint Application System. For example, the DoBegin, DoIncrement, and DoEnd member functions are used for incremental commands, such as using the cursor to drag a graphic entity, in which the command has many states resulting from the many mouse event inputs. For present purposes, the internal operation of these commands need not be understood in detail. Rather all that needs be understood is that all commands applied to a compound document are applied by passing a command binding to one of these member functions as a call parameter. Once the command bindings are passed in to the interface, the interface member functions, as stated above, may perform many ancillary functions, such as logging the command and the like.

Various aspects of the distribution of commands to each collaborator to ensure proper collaboration are discussed below. In particular, the distribution portions of the structure of the TCompoundDocument DoBegin() member function discussed above are illustrated and its operation is discussed. The other command processing member functions use analogous distribution mechanisms and are not shown.

```
void TCompoundDocument::DoBegin (TAbstractDocumentComponent-
CommandBinding& theBinding)
{
    //keep a handle on the last command
    fLastSentCommand = &theBinding
    //send the command to the caucus
    fCommandDispatcher->DoBegin(theBinding);
    //Block until the condition is signaled indicating that the binding is echoed
    // back from the caucus
    TMonitorEntry entry(&fConditionLock);
    while (fReceivedBinding == 0)
        fReceivedBindingCondition.Wait();
    //Reset the condition variable
    fReceivedBinding = 0
    // the binding is sent to the caucus and should be received by all members
    // now, finally, execute the binding
    theBinding.DoBegin();
}
```

Figure 7:
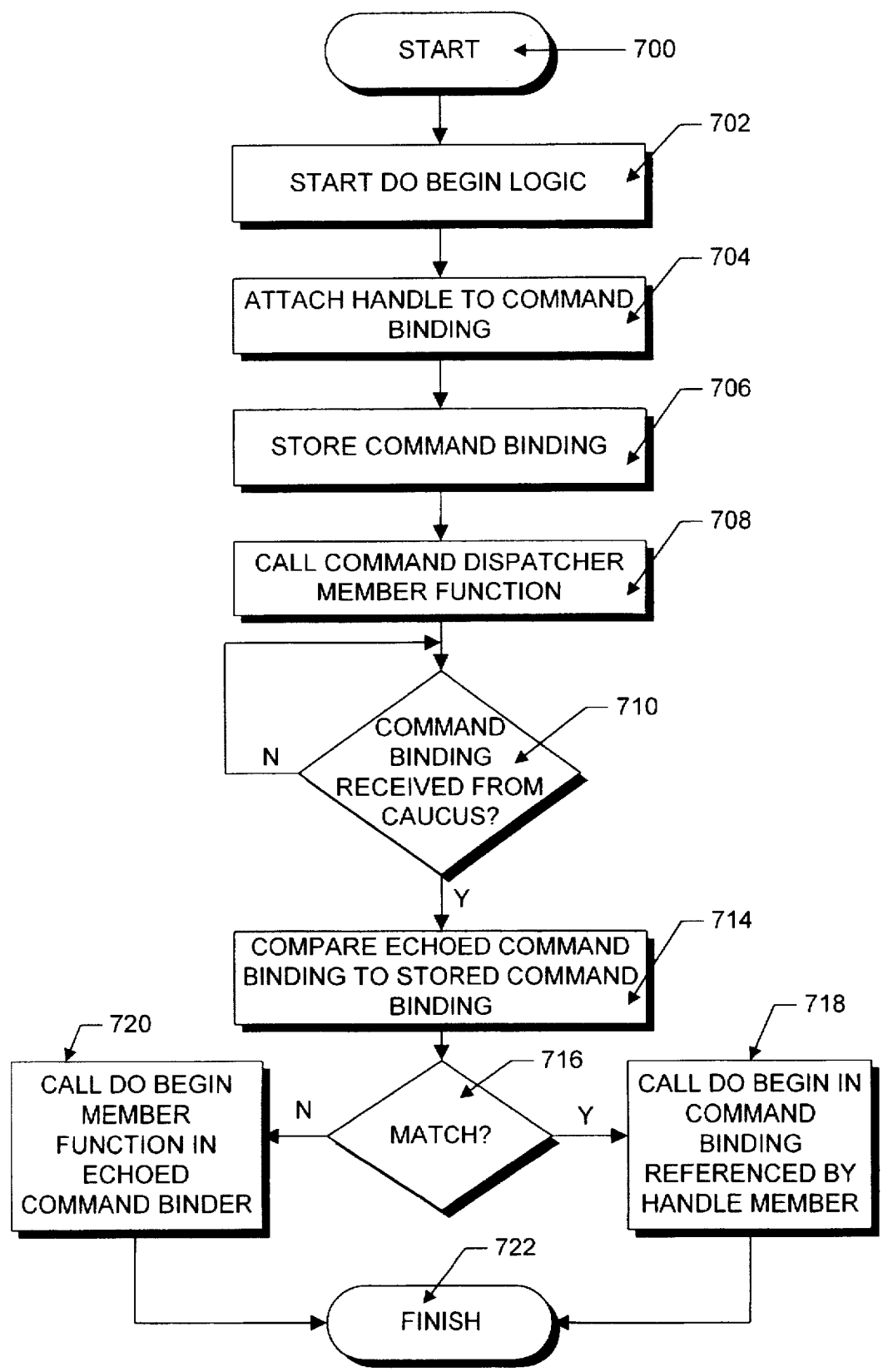
FIG. 7 is an illustrative flowchart showing command binding processing in accordance with a preferred embodiment of the invention.

An illustrative flowchart depicting the operation of the system in processing a command binding is shown in FIG. 7. The operation commences in step 700 and proceeds to step 702 in which the DoBegin() logic is started. In accordance with a preferred embodiment, upon receiving a command binding, DoBegin first attaches a handle to the command binding (step 704) and stores the command binding in the local memory as shown in step 706. The handle will be used to retrieve and process the command binding as described in detail below. After a handle is attached to the command binding, it is passed as a call parameter to a command dispatcher object, which is created during the creation of the TCompoundDocument instance. More particularly, as set forth on step 708, the command binding is passed to a member function of the dispatcher object that mirrors the member function of the compound document; in the instant case, this member function is DoBegin(). The command dispatcher then sends the command binding to the caucus using the interface instances.

As set forth in step 710, the DoBegin logic of TCompoundDocument then blocks until the binding is echoed back from the caucus, as is explained below. Eventually, the caucus broadcasts the command binding sent by fCommandDispatcher to all caucus members, that is, the document server and all collaborators, including the sender. When the collaborator detects that its command binding has been broadcast, i.e., echoed back, the DoBegin logic of TCompoundDocument unblocks and applies a command binding to the document by calling a corresponding DoBegin member function on the command binding.

Again, in accordance with a preferred embodiment of the invention, the echoed command binding copy is compared to the stored command binding as set forth in step 714. If a match is detected in step 716 (indicating that the collaborator originally sent the command binding), the routine proceeds to step 718 where the stored command binding is applied to the local document copy by calling the DoBegin() member function on the command binding referenced by the handle. In this fashion, the stored original command binding is applied, rather than the echoed copy of the command binding. This is done so that any potential exceptions raised by this command binding may be referred to the actual binding that raised the exception. The overall collaborative functionality could operate if the command were merely dispatched, providing that the echoed copy were executed by the sender. However, if the actual command binding somehow caused an exception, by the time the exception is thrown, the actual command binding could be gone, i.e., destructed, and the exception would have no object to refer to, thus making the overall code less desirable and maintainable.

Alternatively, if no match is detected in step 716, the routine process to step 720 in which the echoed command binding is applied to the local document copy by calling the DoBegin() member function in the echoed command binding. The routine then ends in step 722.

The command dispatcher object, fCommandDispatcher, is created as part of TCompoundDocument creation and, illustratively, from the following class definition:

```
class TCommandDispatcher
{
public
TCommandDispatcher (TDocumentReference* adopt);
virtual void    AdoptAndDo(TCommandBinding *);
virtual void    AdoptAndDo
                    (TAbstractDocumentComponentCommandBinding *)
virtual void    DoBegin
                    (TAbstractDocumentComponentCommandBinding&);
virtual void    DoIncrement
                    (TAbstractDocumentComponentCommandBinding&);
virtual void    AdoptAndDoEnd
                    (TAbstractDocumentComponentCommandBinding *);
virtual void    HandleReceivedMessage(TMemory&);
virtual void    HandleReceivedAdoptAndDo
                    (TAbstractDocumentComponentCommandBinding *);
virtual void    HandleReceivedDoBegin
                    (TAbstractDocumentComponentCommandBinding&);
virtual void    HandleReceivedDoIncrement (TMemory&);
virtual void    HandleReceivedAdoptAndDoEnd(TMemory&);
}
```

The various Do and AdoptAndDo member functions include logic for creating Send Message instances, storing the command binding therein, and sending the message to the caucus. The various Handle member functions are responsible for receiving messages from the caucus. The Handle functions include logic for creating Receive Message instances and also for performing selected filtering.

In particular, any messages received by another caucus member are applied to the document. That is, the Handle functions will include logic to execute the binding, e.g., example Binding.DoBegin(). However, any commands received by a collaborator that the collaborator itself sent (that is, the sender's identity matches the caucus member's identity) are filtered out. The Handle function will not execute these; instead, upon detecting such a match, the dispatcher will unlock the lock being monitored by the corresponding member function of TCompoundDocument. In this fashion, the member function of TCompoundDocument will unblock and execute the actual command binding, as discussed above, and the dispatcher will ignore the echoed copy, for the above-stated reasons.

Other collaborators receiving the broadcast command bindings will have their corresponding member functions apply the command binding to the replicated copy, as these commands will not be filtered out. In addition, the document server will also have its handle member functions on its dispatcher apply the command bindings to the original copy being managed by the document server.

Although the above embodiments are discussed in the context of CDF and other interrelated frameworks provided by the CommonPoint Application System, the invention itself transcends the use of these frameworks. For example, the functionality as described above could be developed from scratch rather than leveraging the frameworks provided by the CommonPoint Application System. Skilled artisans will appreciate that many obvious variations follow from the above description. For example, the invention may be extended to include commands that operate on the model and commands that affect the presentation. Presentation commands do not require the use of the command binding semantics and thus are not distributed to the caucus as part of the normal course of events. However, if application developers would like presentation and other commands to be distributed to the caucus, they need only develop new commands that take the desired commands and place them in a command binding wrapper.

While the invention has been described in terms of a preferred embodiment in a specific system environment, those skilled in the art recognize that the invention can be practiced, with modification, in other and different hardware and software environments within the spirit and scope of the appended claims.

What is claimed is:

1. A Shared Document Framework for use by an application program executing on a computing system having a processor and a memory, the framework providing collaborative access by a plurality of caucus members to a shared document, and comprising:

(a) means for creating a caucus service associated with the document, the caucus service including means for receiving messages from each of the plurality of caucus members and broadcast transmitting the messages to all of the plurality of caucus members in global order; and (b) shared document class information, residing in the memory, for creating a shared document instance in the memory in response to a document open request by the application program, the shared document class information including:

first program code logic, executable on the processor, for creating a local copy of the shared document in the memory, second program code logic, executable on the processor, for causing the application program to join the caucus service as a caucus member;

third program code logic, executable on the processor, for receiving a command binding from the application program and sending a copy of the received command binding to the caucus service as a message; and fourth program code logic, executable on the processor and responsive to a command binding broadcast by the caucus, for applying a command binding to the local copy of the shared document through a predefined document interface.

2. The framework of claim 1 wherein the third program code logic stores the command binding received from the application program.

3. The framework of claim 2 wherein the fourth program code logic is responsive to a command binding broadcast by the caucus for comparing the broadcast command binding to the command binding stored by the third program code logic and for applying the broadcast command binding to the local shared document copy through a predefined document interface when the broadcast command binding is not the same as the stored command binding.

4. The framework of claim 3 wherein the fourth program code logic applies the stored command binding to the local shared document copy through a predefined document interface when the broadcast command binding is the same as the stored command binding.

5. The framework of claim 1 wherein the predefined document interface includes a plurality of predefined member functions that receive the command binding as a call parameter and wherein the plurality of predefined member functions include member functions for handling incremental commands.

6. The framework of claim 1 wherein the first program logic includes
logic responsive to the document open request for pausing the caucus service thereby preventing messages from being broadcast;
logic for obtaining a copy of the shared document;
logic for transferring the shared document copy to the application program issuing the document open request; and
logic responsive to the transfer of the shared document copy for resuming the caucus so that it will resume broadcasting messages.

7. The framework of claim 1 further comprising
program code logic responsive to a first request to open the shared document for constructing a document server having a predefined document interface and means for opening the shared document;
program code logic for causing the document server to join the caucus service as a caucus member, wherein messages broadcast on the caucus service are received by the document server and applied to the original copy of the shared document; and
program code logic in the document server for cooperating with the first program logic for creating a local copy of the shared document for the application program.

8. The apparatus of claim 1 further comprising:
means responsive to a first request to open the shared document for constructing a document server program in the memory, the document server program having a predefined document interface and means for opening the shared document;
means for causing the document server to join the caucus service as a caucus member, wherein messages broadcast on the caucus service are received by the document server and applied to the original copy of the shared document; and
means in the document server for cooperating with the first program logic for creating a local copy of the shared document for each of the plurality of application programs.

9. The method of claim 1 wherein the predefined document interface includes a plurality of predefined member functions and wherein step (f) further comprises the step of:
(f4) calling at least one of the predefined member function using the command binding as a call parameter.

10. Collaboration apparatus for use in a computing system having a processor and a memory, the apparatus providing collaborative access by a plurality of application programs to a shared document, and comprising:
(a) caucus means in the memory responsive to messages received from each of a plurality of caucus members for broadcast transmitting received messages to all of the plurality of caucus members in global order; and
(b) means for creating a local copy of the shared document in the memory for each of the plurality of application programs;

(c) means for creating a predefined document interface for each local copy of the shared document;
(d) means for causing each of the plurality of application programs to join the caucus service as a caucus member;
(e) means for receiving a command binding from one of the plurality of application programs and sending a copy of the received command binding to the caucus service as a message; and
(f) means in each of the plurality of application programs and responsive to a command binding broadcast by the caucus, for applying a command binding to the application local copy of the shared document through the predefined document interface for the local copy.

11. The apparatus of claim 10 wherein the receiving means comprises means for storing the command binding received from the application program in the memory.

12. The apparatus of claim 11 wherein the applying means comprises means responsive to a command binding broadcast by the caucus for comparing the broadcast command binding to the command binding stored by the third program code logic and means for applying the broadcast command binding to the local shared document copy through a predefined document interface when the broadcast command binding is not the same as the stored command binding.

13. The apparatus of claim 12 wherein the applying means comprises means for applying the stored command binding to the local shared document copy through a predefined document interface when the broadcast command binding is the same as the stored command binding.

14. The apparatus of claim 10 wherein the predefined document interface includes a plurality of predefined member functions that receive the command binding as a call parameter and wherein the plurality of predefined member functions include member functions for handling incremental commands.

15. The apparatus of claim 10 wherein the means for creating a local copy of the shared document includes:
means responsive to a document open request from one of the plurality of application programs for pausing the caucus service thereby preventing messages from being broadcast;
means for obtaining a copy of the shared document;
means for transferring the shared document copy to the application program issuing the document open request; and
means responsive to the transfer of the shared document copy for resuming the caucus so that it will resume broadcasting messages.

16. A method for use in a computing system having a processor and a memory, the method providing collaborative access by a plurality of application programs to a shared document, and comprising the steps of:
(a) constructing a caucus service program in the memory, the caucus service program being responsive to messages received from each of a plurality of caucus members for broadcast transmitting received messages to all of the plurality of caucus members in global order; and
(b) creating a local copy of the shared document in the memory for each of the plurality of application programs;
(c) creating a predefined document interface for each local copy of the shared document;
(d) causing each of the plurality of application programs to join the caucus service as a caucus member;

(e) receiving a command binding from one of the plurality of application programs and sending a copy of the received command binding to the caucus service as a message; and (f) applying a command binding to the local copy of the shared document for each of the plurality of applications through the predefined document interface in response to a command binding broadcast by the caucus.

17. The method of claim 16 wherein step (e) comprises the step of:

(e1) storing the command binding received from the application program in the memory.

18. The method of claim 17 wherein step (f) comprises the steps of:

(f1) comparing the broadcast command binding to the command binding stored in step (e1); and (f2) applying the broadcast command binding to the local shared document copy through a predefined document interface when the broadcast command binding is not the same as the stored command binding.

19. The method of claim 18 wherein step (f) further comprises the steps of:

(f3) applying the stored command binding to the local shared document copy through a predefined document interface when the broadcast command binding is the same as the stored command binding.

20. The method of claim 16 wherein step (b) comprises the steps of:

(b1) pausing the caucus service thereby preventing messages from being broadcast;

(b2) obtaining a copy of the shared document;

(b3) transferring the shared document copy to one of the plurality of application programs issuing a document open request; and (b4) resuming the caucus so that it will resume broadcasting messages.

21. The method of claim 16 further comprising the steps of:

(g) constructing a document server having a predefined document interface and means for opening the shared document in response to a first request from one of the plurality of application programs to open the shared document;

(h) causing the document server to join the caucus service as a caucus member, wherein messages broadcast on the caucus service are received by the document server and applied to the original copy of the shared document; and (l) using the document server to create a local copy of the shared document for each of the plurality of application programs.

22. A computer program product for use by an application program executing on a computing system having a processor and a memory, the computer program product providing collaborative access by a plurality of caucus members to a shared document, and comprising a computer usable medium having computer readable program code means including:

(a) means for creating a caucus service associated with the document, the caucus service including means for receiving messages from each of the plurality of caucus members and broadcast transmitting the messages to all of the plurality of caucus members in global order; and (b) shared document class information for creating a shared document instance in the memory in response to a document open request by the application program, the shared document class information including:

first program code logic means for creating a local copy of the shared document in the memory, second program code logic means for causing the application program to join the caucus service as a caucus member;

third program code logic means for receiving a command binding from the application program and sending a copy of the received command binding to the caucus service as a message; and fourth program code logic means responsive to a command binding broadcast by the caucus, for applying a command binding to the local copy of the shared document through a predefined document interface.

23. The computer program product of claim 22 wherein the third program code logic means including means for storing the command binding received from the application program in the memory.

24. The computer program product of claim 23 wherein the fourth program code logic means is responsive to a command binding broadcast by the caucus for comparing the broadcast command binding to the command binding stored by the third program code logic means and for applying the broadcast command binding to the local shared document copy through a predefined document interface when the broadcast command binding is not the same as the stored command binding.

25. The computer program product of claim 24 wherein the fourth program code logic means applies the stored command binding to the local shared document copy through a predefined document interface when the broadcast command binding is the same as the stored command binding.

* * * * *